(12) United States Patent
Miyachi et al.

(10) Patent No.: US 6,985,200 B2
(45) Date of Patent: Jan. 10, 2006

(54) LIQUID CRYSTAL OPTICAL ELEMENT AND METHOD FOR FABRICATING THE SAME

(75) Inventors: Koichi Miyachi, Kyoto (JP); Seiji Shibahara, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 146 days.

(21) Appl. No.: 10/680,574

(22) Filed: Oct. 7, 2003

(65) Prior Publication Data
US 2004/0070699 A1 Apr. 15, 2004

(30) Foreign Application Priority Data
Oct. 9, 2002 (JP) .............................. 2002-296008

(51) Int. Cl.
*G02F 1/1337* (2006.01)

(52) U.S. Cl. ..................................................... 349/127

(58) Field of Classification Search ................. 349/123, 349/127
See application file for complete search history.

(56) References Cited

U.S. PATENT DOCUMENTS 5,745,207 A 4/1998 Asada et al.

FOREIGN PATENT DOCUMENTS

WO WO 00/03288 1/2000

OTHER PUBLICATIONS

Asako Ikeda et al.; Influence of the Optical Purity on the Smectic Layer Thickness and the Transition Order in Enantiomeric Mixtures of an Antiferroelectric Liquid Crystal; Japanese Journal of Applied Physics; vol. 30, No. 6A; Jun. 1991; pp. L1032-L1035.

*Primary Examiner*—Dung T. Nguyen
*Assistant Examiner*—Richard H Kim
(74) *Attorney, Agent, or Firm*—Keating & Bennett, LLP (57) ABSTRACT

A liquid crystal optical element includes: first and second substrates; a liquid crystal layer provided between the substrates; first and second electrode layers provided on the first and second substrates, respectively, so as to face each other with the liquid crystal layer interposed between them; and first and second switching layers, which are provided between the first electrode layer and the liquid crystal layer and between the second electrode layer and the liquid crystal layer, respectively, and each of which includes molecules changing their orientation directions in response to a voltage applied between the first and second electrode layers. The liquid crystal layer changes its orientation state as the molecules in the first and second switching layers change their orientation directions. Each of the molecules included in one of the first and second switching layers and an associated one of the molecules included in the other switching layer behave as enantiomers.

19 Claims, 6 Drawing Sheets

FIG.6A PRIOR ART ic element and a method for fabricating the liquid crystal optical element. More particularly, the present invention relates to a liquid crystal optical element for use in a display device for presenting characters, graphics and so on, and an optical shutter for changing the quantity of incoming light transmitted, and a method for fabricating such a liquid crystal optical element.

2. Description of the Related Art

Recently, liquid crystal displays (LCDs) have found a broad variety of applications as displays for TVs, computers, mobile electronic units and so on by utilizing their advantageous features including significantly reduced size or weight and power dissipation.

However, the conventional twisted nematic (TN) mode LCDs and super twisted nematic (STN) mode LCDs achieve narrow viewing angles. To overcome this problem, various "in-plane switching modes" were proposed as modes to control the orientation directions of liquid crystal molecules in a liquid crystal layer.

For example, in a proposed in-plane switching mode for liquid crystal molecules, a lateral electric field is generated by comb-shaped electrodes parallel to the surface of a nematic liquid crystal layer. According to other proposed modes, ferroelectric and antiferroelectric liquid crystal layers are also used. In each of these proposed modes, the liquid crystal molecules change their orientation directions parallel to the surface of the liquid crystal layer, thus achieving a wide viewing angle characteristic.

In the mode of generating the lateral electric field, however, no electric field is generated over the comb-shaped electrodes and portions of the liquid crystal layer, located over those electrodes, do not contribute to display operation, thus resulting in a significantly decreased aperture ratio. To generate the lateral electric field, at least two electrodes need to be provided within each picture element region such that different potentials are applied to two adjacent electrodes. Normally, several electrodes are densely arranged at a shortened pitch so as to generate a sufficiently strong lateral electric field. However, only the gaps between those electrodes can respond to the applied voltage and contribute to the display operation. In this mode, even if the electrodes are made of a transparent material, no electric field is generated over the electrodes, either, and portions of the liquid crystal layer over the electrodes never respond to the applied voltage or contribute to the display operation. Consequently, considering its operating principle, this mode utilizing the lateral electric field should result in a lower aperture ratio than a mode utilizing a vertical electric field.

On the other hand, in the mode utilizing the ferroelectric or antiferroelectric liquid crystal layer, the cell thickness must be about 2 $\mu$m or less. At such a small cell thickness, the contrast ratio should decrease unless defects are totally eliminated from the orientation state of the liquid crystal molecules. Thus, such a mode is hard to realize due to the difficulty of the manufacturing process. That is to say, LCDs operating in such a mode are difficult to produce constantly.

Figure 4:
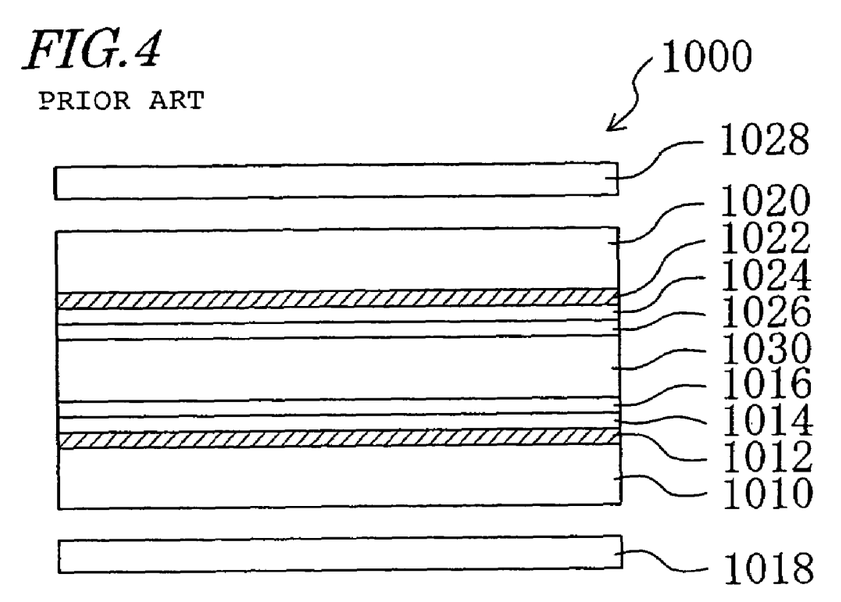
FIG. 4 is a cross-sectional view schematically illustrating a conventional liquid crystal optical element 1000.

To overcome these problems, PCT International Publication No. 00/03288 discloses a liquid crystal optical element that includes: a liquid crystal layer made of a nematic liquid crystal material; and two more liquid crystal layers, which are provided so as to interpose the nematic liquid crystal layer between them and made of a ferroelectric liquid crystal material. FIG. 4 shows a liquid crystal optical element 1000 disclosed in the document identified above.

As shown in FIG. 4, the liquid crystal optical element 1000 includes a first substrate 1010, a second substrate 1020, and first, second and third liquid crystal layers 1016, 1030 and 1026 provided between the first and second substrates 1010 and 1020.

A first electrode 1012 and a second electrode 1022 are provided on the first and second substrates 1010 and 1020, respectively, so as to face each other with the first, second and third liquid crystal layers 1016, 1030 and 1026 interposed between them. A first alignment layer 1014 and a second alignment layer 1024 are provided so as to cover the first and second electrodes 1012 and 1022, respectively. Also, a first polarizer 1018 and a second polarizer 1028 are further provided on the outside surfaces of the first and second substrates 1010 and 1020, respectively.

The first and third liquid crystal layers 1016 and 1026 are located on the first and second alignment layers 1014 and 1024, respectively, and the second liquid crystal layer 1030 is provided between the first and third liquid crystal layers 1016 and 1026. The first and third liquid crystal layers 1016 and 1026 are made of a ferroelectric polymer liquid crystal material, while the second liquid crystal layer 1030 is made of a nematic liquid crystal material.

Hereinafter, it will be described with reference to FIGS. 5A and 5B how this liquid crystal optical element 1000 operates. Specifically, FIG. 5A shows a state of the liquid crystal optical element 1000 in which a predetermined voltage is applied between the first and second electrodes 1012 and 1022, while FIG. 5B shows another state of the liquid crystal optical element 1000 in which a voltage having the opposite polarity is applied there.

Figure 5A:
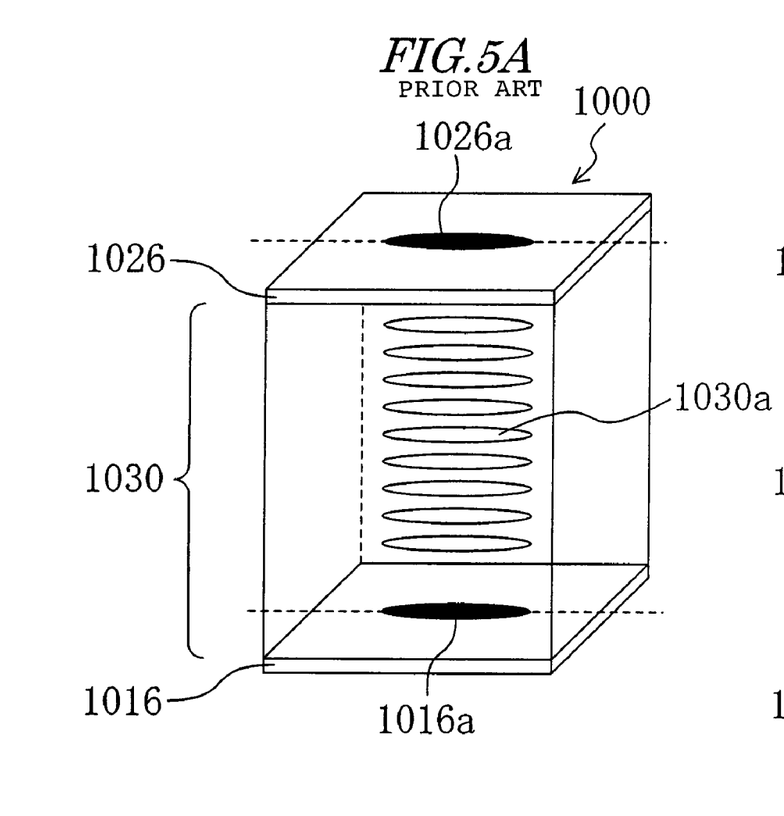
FIGS. 5A and 5B are perspective views schematically showing a state of the liquid crystal optical element 1000 in which a predetermined voltage is applied between the first and second electrode layers thereof and another state of the liquid crystal optical element 1000 in which a voltage having the opposite polarity is applied there, respectively.
Figure 5B:
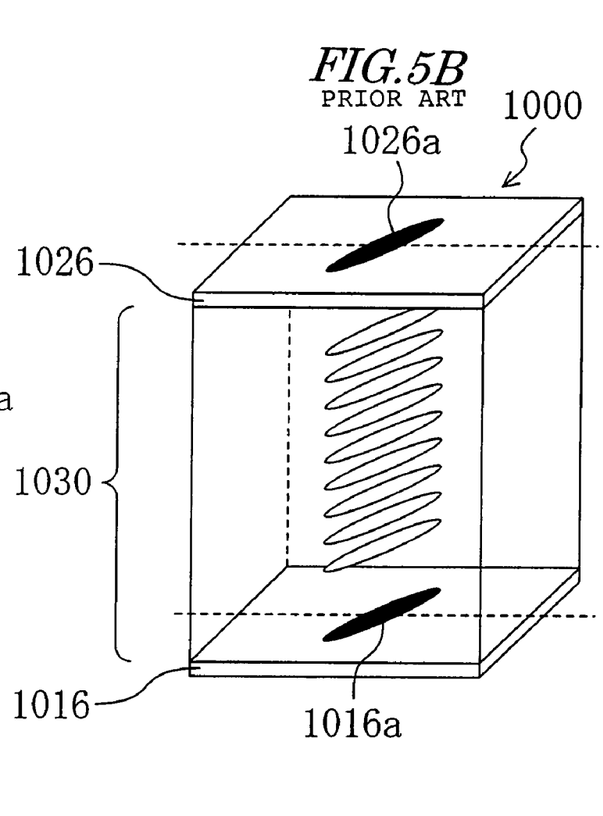

In the liquid crystal optical element 1000, a liquid crystal molecule 1016a included in the first liquid crystal layer 1016 and a liquid crystal molecule 1026a included in the third liquid crystal layer 1026 make in-plane switching parallel to the surfaces of the second liquid crystal layer 1030 (i.e., parallel to the inner surfaces of the first and second substrates 1010 and 1020) in response to the voltage applied between the first and second electrodes 1012 and 1022 as shown in FIGS. 5A and 5B. On the other hand, liquid crystal molecules 1030a included in the second liquid crystal layer 1030 between the first and third liquid crystal layers 1016 and 1026 also make in-plane switching under the influence of the liquid crystal molecules 1016a and 1026a in the first and third liquid crystal layers 1016 and 1026.

In the liquid crystal optical element 1000, the liquid crystal molecules 1030a make in-plane switching in this manner. Accordingly, a wide viewing angle characteristic is achievable by applying this liquid crystal optical element 1000 to a display device. In addition, the first and second electrodes 1012 and 1022 can be transparent electrodes, thus achieving a high aperture ratio. Furthermore, in this liquid crystal optical element 1000, there is no need to decrease the cell thickness excessively, and therefore, constraints on the manufacturing process can be relaxed. As a result, such a liquid crystal optical element can be produced easily enough.

The liquid crystal optical element 1000 may be fabricated in the following manner, for example.

First, a first electrode 1012, made of transparent and conductive ITO, is defined on a first substrate 1010 of glass, for example. Next, a first alignment layer 1014 of $SiO_x$ is deposited over the first electrode 1012. Subsequently, a first liquid crystal layer 1016 of a photopolymerizable liquid crystal material is provided on the first alignment layer 1014.

In the meantime, a second electrode 1022, a second alignment layer 1024 and a third liquid crystal layer 1026 are formed in this order on a second substrate 1020 in the same way.

Thereafter, the first and second substrates 1010 and 1020 are bonded together such that the first and third liquid crystal layers 1016 and 1026 on the first and second substrates 1010 and 1020 face each other. Finally, a liquid crystal material is injected within a vacuum into the gap between the first and second substrates 1010 and 1020, thereby defining a second liquid crystal layer 1030.

Figure 6A:
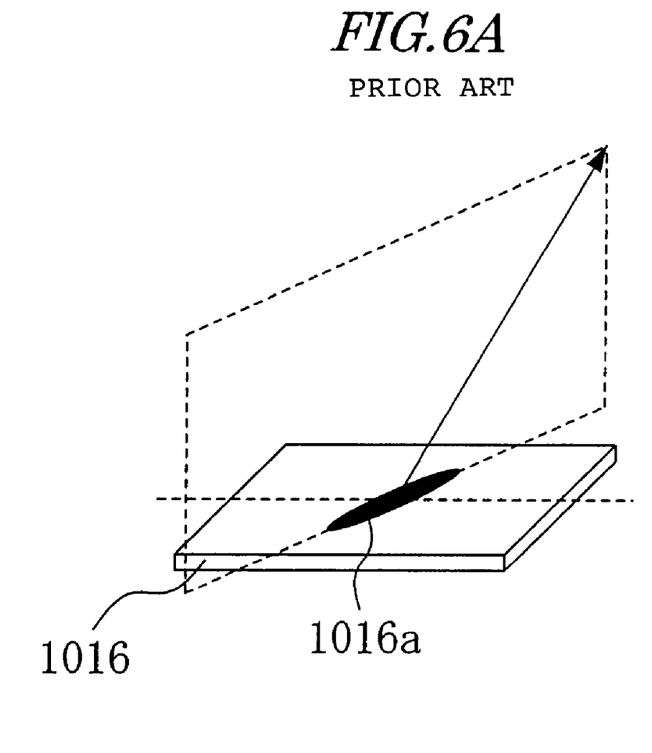
FIGS. 6A and 6B show how a light coloring phenomenon occurs in the liquid crystal optical element 1000.
Figure 6B:
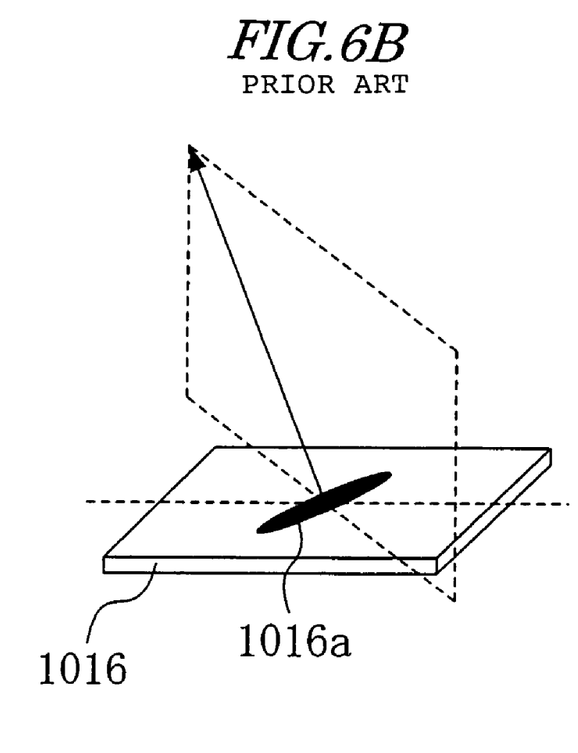

However, the liquid crystal optical element 1000 shown in FIGS. 4, 5A and 5B causes an unwanted coloring phenomenon when the display thereof is viewed obliquely (to a normal which is defined perpendicularly to the principal surface of the first or second substrate). Specifically, when the display is viewed along the major axis of the liquid crystal molecule 1016a as shown in FIG. 6A, then the outgoing light ray becomes bluish. On the other hand, when the display is viewed along the minor axis of the liquid crystal molecule 1016a as shown in FIG. 6B, then the outgoing light ray becomes yellowish. That is to say, in this liquid crystal optical element 1000, every light ray passing obliquely through the second liquid crystal layer 1030 (i.e., so as to form a tilt angle with respect to a normal which is defined perpendicularly to the liquid crystal layer 1030) becomes bluish or yellowish unintentionally. This is because the retardation of the liquid crystal molecule has wavelength dispersiveness (or wavelength dependence).

Also, in the manufacturing process of the liquid crystal optical element 1000 as disclosed in the document identified above, after the first and third liquid crystal layers 1016 and 1026 have been formed on the first and second substrates 1010 and 1020, respectively, the first and second substrates 1010 and 1020 are bonded together, and then the liquid crystal material of the second liquid crystal layer 1030 is injected. Accordingly, during such a manufacturing process, the first and third liquid crystal layers 1016 and 1026 are exposed to the air and may have disturbed orientation states. More specifically, in the vicinity of the interface between the liquid crystal layer and the air, the liquid crystal molecules turn a hydrophobic group toward the air and a hydrophilic group toward the depth of the liquid crystal layer, which is analogous in principle to soap bubble forming. As a result, the liquid crystal molecules are oriented vertically. Then, some of the liquid crystal molecules in the second liquid crystal layer 1030 are also oriented vertically under the influence of the first and third liquid crystal layers 1016 and 1026. Consequently, those portions make the screen brightness uneven, thus deteriorating the display quality.

SUMMARY OF THE INVENTION

In order to overcome the problems described above, an object of the present invention is to provide a liquid crystal optical element, which achieves a high aperture ratio, a wide viewing angle characteristic and high productivity with the unwanted coloring phenomenon of the outgoing light minimized.

Another object of the present invention is to provide a method for fabricating such a liquid crystal optical element with a high aperture ratio, a wide viewing angle characteristic and high productivity without decreasing the display quality thereof.

A liquid crystal optical element according to a preferred embodiment of the present invention preferably includes first and second substrates, a first liquid crystal layer, first and second electrode layers and first and second switching layers. The first liquid crystal layer is preferably provided between the first and second substrates. The first and second electrode layers are preferably provided on the first and second substrates, respectively, so as to face each other with the first liquid crystal layer interposed between them. The first and second switching layers are preferably provided between the first electrode layer and the first liquid crystal layer and between the second electrode layer and the first liquid crystal layer, respectively. Each of the first and second switching layers preferably includes molecules that change their orientation directions in response to a voltage applied between the first and second electrode layers. The first liquid crystal layer preferably changes its orientation state as the molecules included in the first and second switching layers change their orientation directions. Each of the molecules included in one of the first and second switching layers and an associated one of the molecules included in the other switching layer preferably behave as a pair of enantiomers.

In one preferred embodiment of the present invention, the molecules included in each of the first and second switching layers preferably change their orientation directions in a plane that is defined parallel to the surface of the first liquid crystal layer.

In a specific preferred embodiment, when the voltage is applied between the first and second electrode layers, the molecule included in the one switching layer and the molecule included in the other switching layer typically change their orientation directions into mutually opposite directions.

In another preferred embodiment, the liquid crystal optical element may further include a first alignment layer between the first switching layer and the first electrode layer and a second alignment layer between the second switching layer and the second electrode layer, respectively. Each of molecules included in one of the first and second alignment layers and an associated one of molecules included in the other alignment layer preferably exist as a pair of enantiomers.

In an alternative preferred embodiment, each of the molecules included in one of the first and second switching layers and an associated one of the molecules included in the other switching layer may exist as a pair of enantiomers.

In a specific preferred embodiment, the first and second switching layers are typically provided as a second liquid crystal layer and a third liquid crystal layer, respectively, each including a liquid crystal material.

In this particular preferred embodiment, the liquid crystal material included in the first and second switching layers preferably exhibits a smectic phase.

In an alternative preferred embodiment, the liquid crystal material included in the first and second switching layers may exhibit at least one of ferroelectricity, antiferroelectricity and ferrielectricity.

In another alternative preferred embodiment, the liquid crystal material included in the first and second switching layers may also be a polymer liquid crystal material.

In still another preferred embodiment, each of the first and second switching layers may include a polymer material.

In yet another preferred embodiment, the first liquid crystal layer preferably includes a liquid crystal material exhibiting a nematic phase.

In this particular preferred embodiment, the liquid crystal material included in the first liquid crystal layer preferably exhibits negative dielectric anisotropy.

Alternatively, the liquid crystal material included in the first liquid crystal layer may exhibit substantially zero dielectric anisotropy.

A liquid crystal optical element according to another preferred embodiment of the present invention preferably includes first and second substrates, a first liquid crystal layer, first and second electrode layers, and first and second switching layers. The first liquid crystal layer is preferably provided between the first and second substrates. The first and second electrode layers are preferably provided on the first and second substrates, respectively, so as to face each other with the first liquid crystal layer interposed between them. The first and second switching layers are preferably provided between the first electrode layer and the first liquid crystal layer and between the second electrode layer and the first liquid crystal layer, respectively. Each of the first and second switching layers preferably includes molecules that change their orientation directions in response to a voltage applied between the first and second electrode layers. The first liquid crystal layer preferably changes its orientation state as the molecules included in the first and second switching layers change their orientation directions. When the voltage is applied between the first and second electrode layers, each of the molecules included in one of the first and second switching layers and an associated one of the molecules included in the other switching layer preferably change their orientation directions into mutually opposite directions but to substantially the same degree such that coloring of a light ray, which has been obliquely incident onto the first liquid crystal layer, is compensated for by a portion of the first liquid crystal layer, which is located closer to one of the first and second switching layers, and by another portion of the first liquid crystal layer, which is located closer to the other switching layer, in a reciprocating fashion.

In one preferred embodiment of the present invention, the molecules included in each of the first and second switching layers preferably change their orientation directions in a plane that is defined parallel to the surface of the first liquid crystal layer.

In another preferred embodiment, each of the molecules included in one of the first and second switching layers and an associated one of the molecules included in the other switching layer preferably behave as a pair of enantiomers.

In this particular preferred embodiment, the liquid crystal optical element preferably further includes a first alignment layer between the first switching layer and the first electrode layer and a second alignment layer between the second switching layer and the second electrode layer, respectively. Each of molecules included in one of the first and second alignment layers and an associated one of molecules included in the other alignment layer preferably exist as a pair of enantiomers.

In still another preferred embodiment, each of the molecules included in one of the first and second switching layers and an associated one of the molecules included in the other switching layer may exist as a pair of enantiomers.

In yet another preferred embodiment, the first and second switching layers are preferably provided as a second liquid crystal layer and a third liquid crystal layer, respectively, each including a liquid crystal material.

A liquid crystal optical element fabricating method according to another preferred embodiment of the present invention is a method for fabricating a liquid crystal optical element that preferably includes: a first substrate and a second substrate; a liquid crystal layer provided between the first and second substrates; a first electrode layer and a second electrode layer, which are provided on the first and second substrates, respectively, so as to face each other with the liquid crystal layer interposed between them; and a first switching layer and a second switching layer, which are provided between the first electrode layer and the liquid crystal layer and between the second electrode layer and the liquid crystal layer, respectively. Each of the first and second switching layers preferably includes molecules that change their orientation directions in response to a voltage applied between the first and second electrode layers. The liquid crystal layer preferably changes its orientation state as the molecules included in the first and second switching layers change their orientation directions. The method preferably includes the steps of: preparing a mixture that includes a liquid crystal material; preparing the first and second substrates on which the first and second electrode layers have been formed, respectively; bonding the first and second substrates together with a predetermined gap provided between them; injecting the mixture into the gap between the bonded substrates; and defining the first and second switching layers on the first and second electrode layers and the liquid crystal layer between the first and second switching layers, respectively, by causing a phase separation in the mixture injected.

In one preferred embodiment of the present invention, the method preferably further includes, before the step of bonding the first and second substrates together, the steps of: preparing a first alignment layer material and a second alignment layer material as a pair of enantiomers; making the first alignment layer of the first alignment layer material on the first electrode layer; and making the second alignment layer of the second alignment layer material on the second electrode layer.

In another preferred embodiment, the step of preparing the mixture may include the step of preparing a polymerizable material. In that case, the step of defining the first and second switching layers and the liquid crystal layer preferably includes the step of selectively polymerizing the polymerizable material on the first and second electrode layers.

In this particular preferred embodiment, the step of selectively polymerizing the polymerizable material preferably includes the step of exposing the mixture to light.

In an alternative preferred embodiment, the step of selectively polymerizing the polymerizable material may include the step of heating the mixture.

In yet another preferred embodiment, the step of preparing the mixture may include the step of preparing a mixture that includes a nematic liquid crystal material and a smectic liquid crystal material. In that case, the step of defining the first and second switching layers and the liquid crystal layer preferably includes the step of defining the liquid crystal layer including the nematic liquid crystal material and the first and second switching layers including the smectic liquid crystal material.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, a liquid crystal optical element according to preferred embodiments of the present invention and a method for fabricating the liquid crystal optical element will be described with reference to the accompanying drawings. It should be noted that the present invention is in no way limited to the following specific preferred embodiments.

Figure 1:
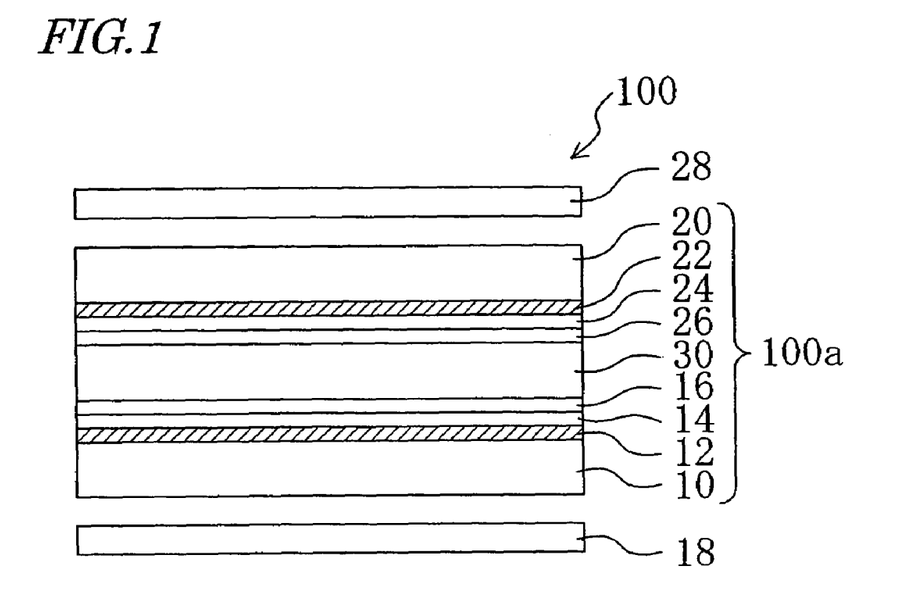
FIG. 1 is a cross-sectional view schematically illustrating a liquid crystal optical element 100 according to a preferred embodiment of the present invention.
Figure 2A:
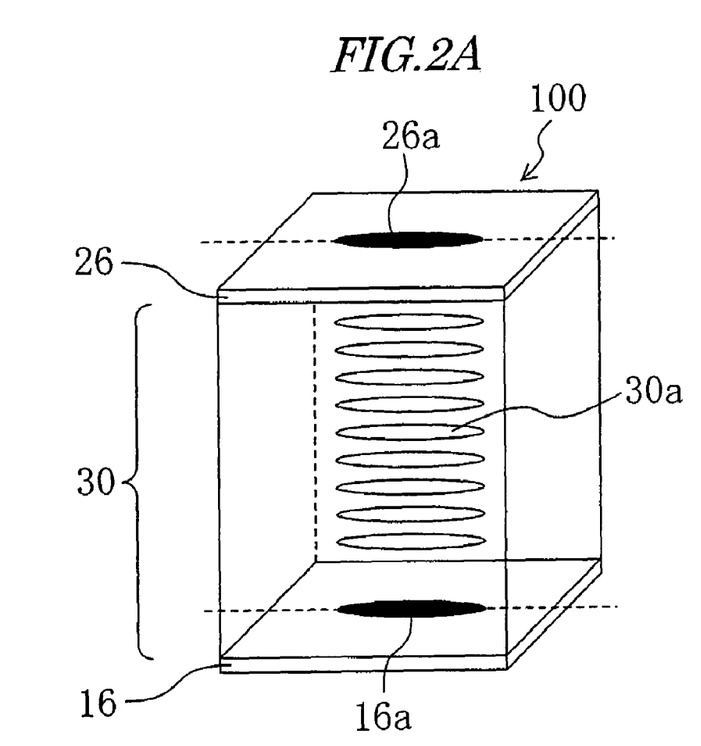
FIGS. 2A and 2B are perspective views schematically showing a state of the liquid crystal optical element 100 in which a predetermined voltage is applied between the first and second electrode layers thereof and another state of the liquid crystal optical element 100 in which a voltage having the opposite polarity is applied there, respectively.
Figure 2B:
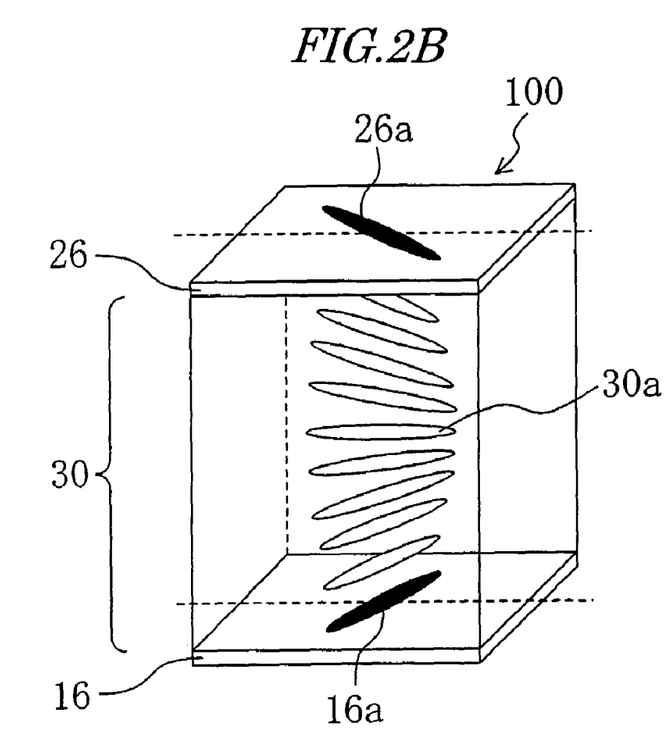

First, the structure and operation of a liquid crystal optical element 100 according to a preferred embodiment of the present invention will be described with reference to FIGS. 1, 2A and 2B. FIG. 1 is a cross-sectional view schematically illustrating the liquid crystal optical element 100. FIGS. 2A and 2B are perspective views schematically showing the liquid crystal optical element 100. Specifically, FIG. 2A shows a state in which a predetermined voltage is applied between first and second electrodes, while FIG. 2B shows a state in which a voltage having the opposite polarity is applied there.

As shown in FIG. 1, the liquid crystal optical element 100 includes a liquid crystal cell 100a and first and second polarizers 18 and 28, which are arranged so as to face each other with the liquid crystal cell 100a interposed between them.

The liquid crystal cell 100a includes a first substrate 10, a second substrate 20, and a liquid crystal layer 30 provided between the first and second substrates 10 and 20. The liquid crystal layer 30 is typically a nematic liquid crystal layer including a liquid crystal material that exhibits a nematic phase.

A first electrode layer 12 and a second electrode layer 22 are provided on the first and second substrates 10 and 20, respectively, so as to face each other with the liquid crystal layer 30 interposed between them. Each of these electrode layers 12 and 22 does not have to be a single continuous conductive layer but may include a number of electrically isolated electrodes.

A first switching layer 16 is provided between the first electrode layer 12 and the liquid crystal layer 30, and a second switching layer 26 is provided between the second electrode layer 22 and the liquid crystal layer 30. As shown in FIGS. 2A and 2B, each of these switching layers 16 and 26 includes a molecule 16a or 26a that changes its orientation direction parallel to the surface of the liquid crystal layer 30 (i.e., parallel to the principal surfaces of the first and second substrates 10 and 20) in response to a voltage applied between the first and second electrode layers 12 and 22. That is to say, the molecules 16a and 26a included in the first and second switching layers 16 and 26 make in-plane switching in response to an electric field that is being applied perpendicularly to the liquid crystal layer 30 (i.e., a vertical electric field).

Each of the first and second switching layers 16 and 26 is typically a liquid crystal layer including a liquid crystal material that exhibits a nematic phase, a smectic phase or a cholesteric phase, for example. If a liquid crystal material exhibiting at least one of ferroelectricity, anti-ferroelectricity or ferrielectricity is included in the switching layers 16 and 26, then the liquid crystal molecules can easily make the in-plane switching in response to the vertical electric field. Among other things, the switching layers 16 and 26 preferably include a liquid crystal material exhibiting a smectic phase, because the smectic phase tends to exhibit the ferroelectricity, antiferroelectricity or ferrielectricity.

Each of these switching layers 16 and 26 is preferably provided on a surface with some anchoring force. In this preferred embodiment, first and second alignment layers 14 and 24 are provided on the first and second electrode layers 12 and 22, respectively, and the first and second switching layers 16 and 26 are provided on the first and second alignment layers 14 and 24, respectively. The first and second alignment layers 14 and 24 preferably have horizontal alignment property. Each of these alignment layers 14 and 24 may be a normal alignment film made of polyimide, for example, for use in a TN mode or STN mode LCD. The alignment film of polyimide or any other suitable material may be either a soluble type in which polyimide is dissolved in a solvent or baking type in which polyimide is produced when baked. Also, to achieve sufficient anchoring force, the alignment films are preferably subjected to some alignment treatment such as a rubbing treatment. Alternatively, the alignment films may also be organic thin films of polyvinylcinnamate or polyimide and may be subjected to a photoalignment treatment through exposure to an ultraviolet ray. Furthermore, the surface of the substrates may also be provided with some anchoring force by obliquely depositing $SiO_x$ thereon, for example.

To control the alignment of the switching layers 16 and 26 more easily, the liquid crystal material included in the switching layers 16 and 26 preferably exhibits a smectic A phase or a nematic phase in a higher temperature range than the phase exhibiting the ferroelectricity, anti-ferroelectricity or ferrielectricity.

Also, in the liquid crystal optical element 100 of this preferred embodiment of the present invention, each of the molecules included in one of the first and second switching layers 16 and 26 (e.g., the molecule 16a in the switching layer 16) and an associated one of the molecules included in the other switching layer (e.g., the molecule 26a in the switching layer 26) preferably behave as a pair of enantiomers.

Accordingly, the molecule 16a in the one switching layer 16 and the molecule 26a in the other switching layer 26 behave as having mutually opposite spontaneous polarizations toward an applied voltage with a polarity. As a result, when a voltage is applied between the first and second electrode layers 12 and 22, the molecule 16a in the switching layer 16 and the molecule 26a in the switching layer 26 change their orientation directions into mutually opposite directions (i.e., make in-plane switching) as shown in FIGS. 2A and 2B.

In the vicinity of the interface between the first switching layer 16 and the liquid crystal layer 30, the liquid crystal molecules 30a in the liquid crystal layer 30 are aligned with the orientation direction of the molecule 16a in the first switching layer 16. On the other hand, in the vicinity of the interface between the second switching layer 26 and the liquid crystal layer 30, the liquid crystal molecules 30a in the liquid crystal layer 30 are aligned with the orientation direction of the molecule 26a in the second switching layer 26. The liquid crystal molecules 30a are aligned in this manner due to an "excluded volume effect". The excluded volume effect refers to a phenomenon in which molecules are aligned parallel to each other so as to reduce the repulsive force caused by the excluded volumes (i.e., to establish a dynamically stabilized state) because each of those molecules has an excluded volume into which no other molecule is allowed to enter.

Meanwhile, the liquid crystal molecules 30a around the center of the liquid crystal layer 30 are tilted such that their orientation state is continuous with that of the liquid crystal molecules 30a in the vicinity of the interfaces. Accordingly, if the molecule 16a in the first switching layer 16 and the molecule 26a in the second switching layer 26 are oriented in the same azimuthal direction, then the liquid crystal molecules 30a in the liquid crystal layer 30 will have a homogeneous orientation state with a zero twist angle as shown in FIG. 2A. On the other hand, if the molecule 16a in the first switching layer 16 and the molecule 26a in the second switching layer 26 are oriented in two different azimuthal directions, then the liquid crystal molecules 30a in the liquid crystal layer 30 will have a twisted orientation state as shown in FIG. 2B.

As described above, the liquid crystal layer 30, located between the first and second switching layers 16 and 26, changes its orientation state as the molecules 16a and 26a included in the first and second switching layers 16 and 26 change their orientation directions.

A display operation may be conducted by modulating the light, passing through the liquid crystal layer 30, through such a change of orientation states. For example, if the first and second polarizers 18 and 28 are arranged as crossed Nicols, then a black display state is realized while the liquid crystal layer 30 is having the homogeneous orientation state shown in FIG. 2A. On the other hand, while the liquid crystal layer 30 is having the twisted orientation state shown in FIG. 2B, a white display state is realized.

The liquid crystal optical element 100 according to this preferred embodiment of the present invention carries out a display operation by allowing the liquid crystal molecules 30a in the liquid crystal layer 30 to make in-plane switching, thus achieving a wide viewing angle characteristic. Also, the first and second electrode layers 12 and 22 to apply a voltage to the first and second switching layers 16 and 26 may be transparent electrodes, thereby realizing a high aperture ratio. Furthermore, since there is no need to reduce the cell thickness excessively (e.g., to about 2 µm or less), the manufacturing process should be carried out easily enough to ensure high productivity. In addition, the first and second switching layers 16 and 26 only need to be thick enough to control the orientation state of the liquid crystal molecules 30a in the liquid crystal layer 30 but may also be too thin to contribute to any optical modulation. Accordingly, even if any misalignment (or alignment defect) has occurred in the switching layers 16 and 26 during the manufacturing process, the contrast ratio on the screen will never decrease.

Also, in the liquid crystal optical element 100 according to this preferred embodiment of the present invention, when a voltage is applied between the first and second electrode layers 12 and 22, the molecule 16a in one switching layer 16 and the molecule 26a in the other switching layer 26 change their orientation directions into mutually opposite directions. Thus, a white display state is realized while the liquid crystal layer 30 is having a twisted orientation state. As a result, the unwanted coloring phenomenon of the outgoing light ray, which often occurs when the screen is viewed obliquely, can be minimized. This is because while the liquid crystal layer 30 is having the twisted alignment, the upper half of the liquid crystal layer 30 and the lower half of the liquid crystal layer 30 shift the wavelength bands of the incoming light to a pair of hues that defines two mutually complementary colors. As a result, optical compensation is done in the thickness direction of the liquid crystal layer 30. For example, if the lower half of the liquid crystal layer 30 makes the incoming light bluish, then the upper half of the liquid crystal layer 30 makes the incoming light yellowish. Consequently, the coloring of the outgoing light is substantially eliminated.

To minimize the unwanted coloring of the outgoing light effectively, the molecule 16a in the one switching layer 16 and the molecule 26a in the other switching layer 26 preferably change their orientation directions to substantially the same degree. Then, the upper half of the liquid crystal layer 30, closer to the second switching layer 26, and the lower half thereof, closer to the first switching layer 16, can effectively compensate for the coloring of light rays that have been incident obliquely.

Furthermore, in the liquid crystal optical element 100 according to this preferred embodiment of the present invention, the molecule 16a included in the one switching layer 16 and the molecule 26a included in the other switching layer 26 behave as a pair of enantiomers. Thus, the liquid crystal optical element 100 can contribute to a display of quality with the coloring phenomenon minimized more effectively. Its mechanism will be described in further detail below.

The tilt angle $\theta$ and response speed $\tau$ of a molecule that is making in-plane switching in a switching layer have a significant effect on the display quality of a liquid crystal optical element. For that reason, each molecule in one switching layer and an associated molecule in the other switching layer preferably have the same tilt angle $\theta$ or response speed $\tau$.

However, the tilt angle $\theta$ and response speed $\tau$ change with the temperature and other parameters. For example, where a liquid crystal material exhibits ferroelectricity, anti-ferroelectricity or ferrielectricity, the response speed $\tau$ is given by $\tau=\eta/Ps \cdot E$, where $\eta$ represents the viscosity, Ps represents the spontaneous polarization and E represents the electric field. Normally, the temperature variation of the spontaneous polarization Ps or tilt angle $\theta$ satisfies $Ps \propto \theta \propto (Tc-T)^\beta$ (where $\beta$ is 0.5 theoretically but is actually in the range of 0.3 to 0.4). Accordingly, the tilt angle $\theta$ and response speed $\tau$ change with the temperature.

Suppose a molecule in one switching layer and an associated molecule in the other switching layer do not exhibit the same characteristic (e.g., temperature characteristic) with respect to the tilt angle $\theta$ or response speed $\tau$. In that case, even if this pair of molecules in the two switching layers should have the same tilt angle $\theta$ or response speed $\tau$ under some condition, the tilt angle $\theta$ or response speed $\tau$ of one of the two molecules will be different from that of the other molecule when the condition (e.g., the temperature) changes. Then, the coloring phenomenon cannot be minimized effectively and display of quality is not realizable.

However, two molecules that exist as a pair of enantiomers exhibit substantially the same temperature characteristic with respect to the tilt angle $\theta$. For example, in a liquid crystal material called "TFMHPDOPB", the tilt angles $\theta$ of an R-enantiomer and an S-enantiomer exhibit the same temperature characteristic (see A. Ikeda et al., Jpn. J. Appl. Phys. 30, L1032 (1991), FIG. 3(a)).

Accordingly, if the molecule 16a in the one switching layer 16 and the molecule 26a in the other switching layer 26 behave as a pair of enantiomers as in the liquid crystal optical element 100 according to this preferred embodiment of the present invention, then the tilt angles θ thereof should exhibit the same characteristic (e.g., the same temperature characteristic). As a result, the coloring phenomenon can be minimized effectively and display of quality is realized.

To make the molecules 16a and 26a in the first and second switching layers 16 and 26 behave as a pair of enantiomers, these two molecules 16a and 26a in the switching layers 16 and 26 may exist as a pair of enantiomers.

Also, the present inventors discovered that if a molecule included in one of the first and second alignment layers 14 and 24, provided under the switching layers 16 and 26, respectively, and an associated molecule included in the other alignment layer 24 or 14 existed as a pair of enantiomers, then the two molecules 16a and 26a included in the switching layers 16 and 26 behaved as another pair of enantiomers. For example, a molecule in one switching layer, provided over one alignment layer including an S-enantiomer molecule, behaves as an S-enantiomer in response to an applied voltage (or vertical electric field). On the other hand, a molecule in the other switching layer, provided over the other alignment layer including an R-enantiomer molecule, behaves as an R-enantiomer in response to the applied voltage (or vertical electric field). As a result, the former molecule in the switching layer, provided over the alignment layer including the S-enantiomer molecule, and the latter molecule in the other switching layer, provided over the other alignment layer including the R-enantiomer molecule, make in-plane switching in mutually opposite directions in response to a voltage applied.

The reasons why the molecules in the switching layers behave in this manner are believed to be that if the molecules in the alignment layers exist as a pair of enantiomers (i.e., optical isomers), then the energy symmetry will decrease in the interface between each of the switching layers and its associated alignment layer. That is to say, if the molecules in the alignment layers exist as a pair of enantiomers, then the energy needed to rotate the molecules in the switching layers, which are aligned under the control of the alignment layers, to the left will be different from the energy needed to rotate the same molecules in the switching layers to the right. Thus, the switching layers have a decreased degree of energy symmetry. For that reason, the molecules in the switching layers behave just like a pair of enantiomers.

Each of the two molecules that exist as a pair of enantiomers in the alignment layers preferably includes a functional group with a great dipole moment. In the same way, each of the two molecules behaving as a pair of enantiomers in the switching layers also preferably includes a functional group with a great dipole moment. If the two molecules in the alignment layers and the two molecules in the switching layers each include such a functional group with a great dipole moment, then the behavior described above is easily realized by the interactions between the dipoles.

The first and second switching layers 16 and 26 preferably have a thickness of about 100 nm to about 200 nm. The reasons are as follows. Specifically, if the switching layers 16 and 26 were thinner than about 100 nm, then the anchoring effect caused by the principal surfaces of the substrates might be too significant to allow the molecules 16a and 26a to move freely in the switching layers 16 and 26. However, if the switching layers 16 and 26 were thicker than about 200 nm, then the molecules 16a and 26a in the switching layers 16 and 26 might rise perpendicularly to the principal surfaces of the substrates, thus possibly making it hard for the molecules 16a and 26a to perform the in-plane switching. Furthermore, if the thickness of the switching layers 16 and 26 is about 100 nm to about 200 nm, which is smaller than the wavelength of visible radiation, then the switching layers 16 and 26 do not contribute optically to modulation of light. Accordingly, even if some misalignment has occurred in the switching layer 16 or 26, the contrast ratio will never decrease.

Also, if the first and second switching layers 16 and 26 include a liquid crystal material (i.e., are liquid crystal layers), then the switching layers 16 and 26 preferably include a polymer liquid crystal material or a polymer material. This is because if the liquid crystal material itself is turned into a polymer or if a network of a polymer material is formed in the switching layers 16 and 26 that are liquid crystal layers, then the compatibility between the switching layer 16 or 26 and the liquid crystal layer 30 will decrease. Thus, it is possible to prevent the characteristic from being deteriorated due to the mixture of the switching layer 16 or 26 with the liquid crystal layer 30.

Specifically, a mixture of a ferroelectric liquid crystal material, a polymerizable compound and a polymerization initiator may be used as a material for the switching layers 16 and 26. In this case, an S-enantiomer liquid crystal material is preferably used as a material for one of the switching layers 16 and 26 and an R-enantiomer liquid crystal material is preferably used as a material for the other switching layer.

As the polymerizable compound, liquid crystalline (meth) acrylate or epoxy acrylate may be used, for example.

Any compound including a liquid crystal skeleton and a polymerizable functional group within a molecule may be used as the liquid crystalline (meth)acrylate. However, to realize gray-scale tone display and low-voltage drive at the same time, a monofunctional liquid crystalline (meth)acrylate, including no methylene spacers between the liquid crystal skeleton and the polymerizable functional group, is preferably used. More preferably, a monofunctional (meth) acrylate, which is an ester acrylate or methacrylate of cyclic alcohol, phenol or aromatic hydroxy compound including, as a partial structure, a liquid crystal skeleton with two six-membered rings, is used. Such a monofunctional (meth) acrylate includes no flexible linking group such as an alkylene group or an oxyalkylene group between a (meth) acryloyloxy group and the liquid crystal skeleton. Accordingly, a rigid liquid crystal skeleton is directly bonded to a polymer main chain, obtained by polymerizing this type of monofunctional (meth)acrylates together, with no linking groups interposed between them. In that case, the thermal agitation of the liquid crystal skeleton is limited by the polymer main chain. Thus, the orientation states of the liquid crystal molecules included in the switching layers could be further stabilized.

Such a compound may be represented by the following chemical formula:

where X may represent either a hydrogen atom or a methyl group, n may be an integer of zero or one, the six-membered rings A, B and C may represent 1,4-phenylene groups or 1,4-transcyclohexyl groups, $Y_1$ and $Y_3$ may represent single bonds, and $Y_2$ may represent a halogen atom, a cyano group or an alkyl or alkoxyl group with a carbon atom number of 1 to 20. Such a compound is particularly preferred because the compound exhibits a liquid crystalline phase at room temperature.

Examples of preferred epoxy acrylates include bisphenol A epoxy acrylate, brominated bisphenol A epoxy acrylate, and phenol novolac epoxy acrylate. An epoxy acrylate includes a photopolymerizable acrylic group, a thermally polymerizable carbonyl group and a hydroxide group within one molecule. Accordingly, if the resin to be cured is not only exposed to light but also heated, then at least one of the two functional groups will cause the polymerization reaction and the resin can be polymerized (or cured) sufficiently with no unreacted portions left.

In the first and second switching layers 16 and 26, the cured portions of a curable composition, including the polymerizable compound, preferably have a concentration of about 0.05 wt % to about 10 wt %. The reasons are as follows. Specifically, if the cured portions have a concentration of less than about 0.05 wt %, then the average angles defined between the orientation directions of the liquid crystal skeleton in the polymerizable compound and those of the ferroelectric liquid crystal material in the first and second switching layers 16 and 26 cannot be almost equal to each other. However, if the cured portions have a concentration exceeding about 10 wt %, then the drive voltage will increase significantly.

To turn the polymerizable compound into a polymer by polymerizing it through the exposure to light or heat, a polymerization initiator is preferably added. By adding the polymerization initiator, the polymerization reaction can be done quickly. Examples of preferred polymerization initiators include methylethylketone peroxide, benzoyl peroxide, cumene hydroid peroxide, tertiary butyl peroctoate, dicumyl peroxide, benzoyl alkyl ethers, acetophenones, benzophenones, xanthone benzoyl ethers and benzyl ketals. Among currently available products, Darocure 1173 or 1116 (produced by Merck & Co., Inc.), Irgacure 184, 369, 651 or 907 (produced by Ciba Specialty Chemicals, Inc.) or Kayacure DETX, EPA or ITA (produced by Nippon Kayaku Co., Ltd.) may be used either as it is or as an appropriate mixture. The polymerization initiator to be added is preferably at most about 10 wt % with respect to the polymerizable compound. This is because if more than about 10 wt % of polymerization initiator were added, then the polymerization initiator would act as an impurity to decrease the resistivity of the liquid crystal material unintentionally.

Optionally, to increase the stability of the liquid crystal material in the switching layers 16 and 26, a stabilizer may also be added. Examples of preferred stabilizers include hydroquinone, hydroquinone alkyl ethers and tertiary butyl catechols. The stabilizer to be added is preferably at most about 1 wt % with respect to the polymerizable compound. This is because if more than about 1 wt % of stabilizer were added, then the stabilizer would act as an impurity to decrease the resistivity of the liquid crystal material unintentionally.

Such a material for the switching layers 16 and 26, including the polymerizable compound described above, is applied onto the surfaces of the substrates that have already been subjected to some alignment treatment, and then exposed to light and/or heated, thereby polymerizing the polymerizable compound and establishing a polymer network in the switching layers 16 and 26. In the process step of polymerizing the photopolymerizable compound through the exposure to light, the exposure dose may be appropriately determined according to the types and concentrations of the liquid crystal material and photo initiator used. The exposure dose is preferably in the range of about 50 mJ/cm$^2$ to about 10,000 mJ/cm$^2$. The reasons are as follows. Specifically, if the exposure dose were less than about 50 mJ/cm$^2$, then the photopolymerizable compound might be cured incompletely. However, if the exposure dose exceeded about 10,000 mJ/cm$^2$, then the liquid crystal material might optically deteriorate significantly.

The liquid crystal layer 30 provided between the first and second switching layers 16 and 26 typically includes a nematic liquid crystal material. If a liquid crystal material with positive dielectric anisotropy is included in the liquid crystal layer 30, then the liquid crystal molecules 30a will make in-plane switching under the influence of the molecules 16a and 26a in the switching layers 16 and 26 when a voltage is applied between the first and second electrode layers 12 and 22. However, the liquid crystal molecules 30a will also make switching outside of the plane as being affected by the voltage applied. That is to say, the liquid crystal molecules 30a will also change their orientation directions in a plane that is not parallel to the surface of the liquid crystal layer 30. In contrast, if either a liquid crystal material with negative dielectric anisotropy or a liquid crystal material with a substantially zero dielectric anisotropy is used, then the liquid crystal molecules 30a will make no switching outside of that plane even when the voltage is applied. Thus, the liquid crystal molecules 30a can make only the in-plane switching just as intended. In particular, if a liquid crystal material with negative dielectric anisotropy is used, then orientation control force will be applied to the liquid crystal molecules 30a so as to orient the liquid crystal molecules 30a parallel to the surface of the liquid crystal layer 30 when the voltage is applied. Thus, stabilized horizontal orientation state is realized. It should be noted that the liquid crystal material with the substantially zero dielectric anisotropy may be obtained by mixing the liquid crystal material with positive dielectric anisotropy and the liquid crystal material with negative dielectric anisotropy appropriately.

The liquid crystal optical element 100 having the structure described above may be fabricated by the conventional method. That is to say, after first and second switching layers 16 and 26 have been provided on first and second substrates 10 and 20, respectively, the first and second substrates 10 and 20 may be bonded together with a gap provided between them, and then a liquid crystal material to define a liquid crystal layer 30 may be injected into the gap. However, if the liquid crystal optical element 100 is fabricated in this manner, then the switching layers 16 and 26 will be exposed to the air and may have disturbed orientation states during the manufacturing process. In that case, the screen brightness will become uneven and the display quality may deteriorate. In contrast, if the liquid crystal optical element 100 is fabricated by the following manufacturing process, then the disturbance in the orientation states of the switching layers 16 and 26 can be minimized and the display quality will not deteriorate.

Hereinafter, a method for fabricating the liquid crystal optical element 100 according to this preferred embodiment of the present invention will be described with reference to FIGS. 3A through 3F.

Figure 3A:
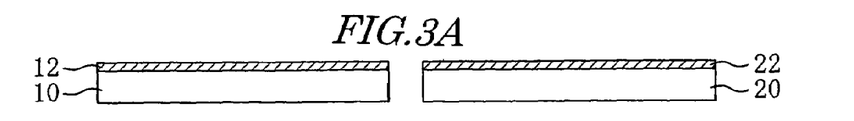
FIGS. 3A through 3F are cross-sectional views schematically showing the respective process steps for fabricating the liquid crystal optical element 100 shown in FIG. 1.

First, as shown in FIG. 3A, a first substrate 10, on which a first electrode layer 12 has been deposited, and a second substrate 20, on which a second electrode layer 22 has been deposited, are prepared. Examples of preferred materials for the first and second substrates 10 and 20 include glasses, plastics and metals. Optionally, substrates with color filters may be used or a pigment or a dye may be dispersed in the substrates to realize a full-color display. Indium tin oxide (ITO) may be used as a material for the electrode layers 12 and 22. Alternatively, the electrode layers 12 and 22 may also be made of an organic conductive thin film of polypyrrole, for example.

In the meantime, first and second alignment layer materials are prepared as a pair of enantiomers. As the first and second alignment layer materials, a polymer material such as polyimide having an asymmetric carbon atom on its side chain may be used, for example. The side chain preferably has the same, or at least similar, structure as a liquid crystal material exhibiting ferroelectricity, and preferably has a functional group exhibiting a great dipole moment.

Figure 3B:
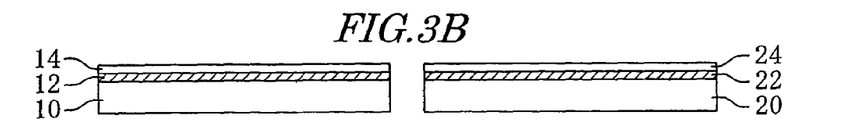

Next, as shown in FIG. 3B, a first alignment layer 14 made of the first alignment layer material is provided on the first electrode layer 12 that has been defined on the first substrate 10. Meanwhile, a second alignment layer 24 made of the second alignment layer material is provided on the second electrode layer 22 that has been defined on the second substrate 20. In this preferred embodiment, the first and second alignment layers 14 and 24 are subjected to a rubbing treatment beforehand so as to have parallel or antiparallel rubbing directions. As a result, the zero twist angle state shown in FIG. 2A is realized. However, if the orientation directions easily define a tilt angle with respect to the rubbing directions even while no voltage is being applied (due to the presence of huge polarization in the alignment layers 14 and 24, for example), then the rubbing directions are preferably defined in advance in view of this tilt angle.

Figure 3C:
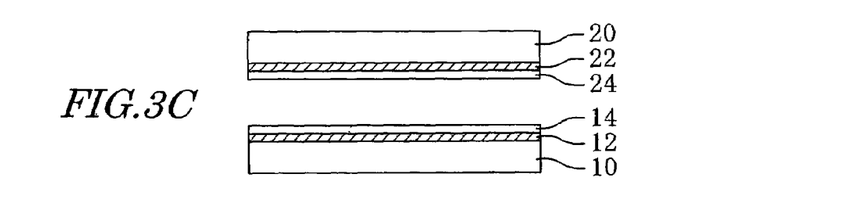

Subsequently, as shown in FIG. 3C, the first substrate 10 on which the first alignment layer 14 has been defined and the second substrate 20 on which the second alignment layer 24 has been defined are bonded together with a predetermined gap provided between them. The gap between the first and second substrates 10 and 20 is preferably about 1 $\mu$m to about 10 $\mu$m. The reasons are as follows. Specifically, if the gap were narrower than about 1 $\mu$m, then good optical modulation might be unachievable by the in-plane switching. However, if the gap were wider than about 10 $\mu$m, then the in-plane switching occurring around the center of the thickness of the liquid crystal layer 30 would have an overly extended response time and the display quality of a moving picture might sometimes deteriorate. To control the gap between the first and second substrates 10 and 20, rod-shaped, spherical or columnar spacers, which are often used to control the cell gap in a normal LCD, may be used. In this preferred embodiment, spherical spacers with a diameter of about 4 $\mu$m are used.

Also, at an arbitrary point in time, a mixture including a liquid crystal material is prepared. In this preferred embodiment, a mixture 40 including a nematic liquid crystal material, a smectic liquid crystal material and a polymerizable material is prepared.

Figure 3D:
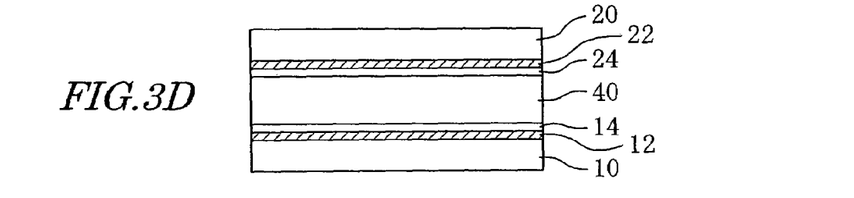

Subsequently, as shown in FIG. 3D, the mixture 40 is injected into the gap between the first and second substrates 10 and 20 that have been bonded together.

Figure 3E:
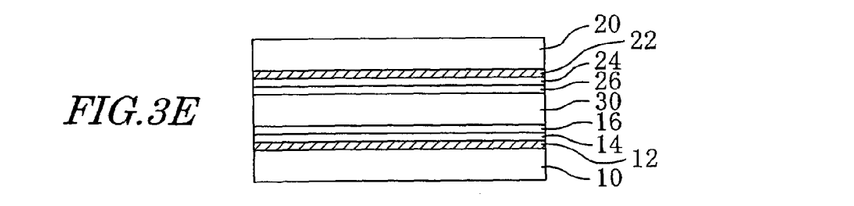

Thereafter, as shown in FIG. 3E, a phase separation is caused in the injected mixture 40, thereby forming first and second switching layers 16 and 26 over the first and second electrode layers 12 and 22 (or more exactly, on the first and second alignment layers 14 and 24), respectively, and defining a liquid crystal layer 30 between the first and second switching layers 16 and 26. That is to say, the single-phase mixture 40 is separated into multiple phases, which are then fixed (or stabilized), thereby defining the first and second switching layers 16 and 26 and the liquid crystal layer 30. In this preferred embodiment, the liquid crystal layer 30 is defined so as to include the nematic liquid crystal material and the first and second switching layers 16 and 26 are defined so as to include the smectic liquid crystal material.

The phase separation of the mixture 40 is carried out by utilizing a difference in chemical or physical property between the multiple components of the mixture 40 or the property of the interface between these components and the principal surfaces of the substrates. Also, in this preferred embodiment, the multiple phases separated may be fixed by selectively polymerizing the polymerizable material, included in the mixture 40, over the first and second electrode layers 12 and 22 (i.e., on the first and second alignment layers 14 and 24). If the polymerizable material is a photopolymerizable material, then the process step of polymerizing the polymerizable material may be carried out by exposing the mixture 40 to light. On the other hand, if the polymerizable material is a thermally polymerizable material, then the process step of polymerizing the polymerizable material may be carried out by heating the mixture 40. The polymerizable material may start being polymerized when the mixture is already separated into multiple phases. Alternatively, the phase separation may be induced by starting the polymerization and then the multiple phases separated may be fixed by continuing the polymerization after that.

Figure 3F:
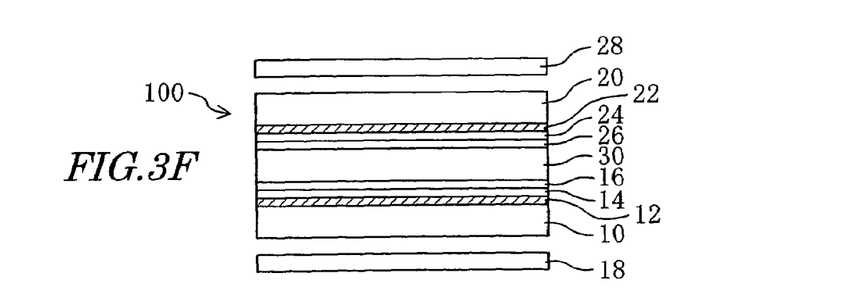

Finally, as shown in FIG. 3F, first and second polarizers 18 and 28 are provided on the outside surfaces of the first and second substrates 10 and 20 (i.e., so as to not to face the liquid crystal layer 30), thereby completing a liquid crystal optical element 100.

In the manufacturing process of the liquid crystal optical element 100 according to the preferred embodiment of the present invention described above, the first and second switching layers 16 and 26 are never exposed to the air, and therefore, the disturbance in orientation directions of the switching layers 16 and 26 can be minimized. As a result, unevenness can be eliminated from the screen brightness and the display quality hardly deteriorates.

Hereinafter, it will be described in further detail how to cause the phase separation in the mixture 40 and how to fix the multiple phases separated in the process step of defining the first and second switching layers 16 and 26 and the liquid crystal layer 30.

If a polymerizable nematic liquid crystal material is added in a relatively large amount to a smectic liquid crystal material exhibiting a smectic phase, then a phase transition occurs from the smectic phase into the nematic phase. When the polymerizable nematic liquid crystal material is polymerized next time, a phase transition from the nematic phase into the smectic phase will occur. By utilizing such a phenomenon, a phase separation can be caused in the mixture 40.

More specifically, after the smectic phase has been made non-stable (i.e., after the nematic phase has been stabilized) by adding the nematic liquid crystal material (preferably having negative dielectric anisotropy) to the smectic liquid crystal material (preferably having negative dielectric anisotropy, too), the polymerizable nematic liquid crystal material is further added, thereby preparing the mixture 40. The polymerizable nematic liquid crystal material may be either photopolymerizable or thermally polymerizable.

After this mixture 40 has been injected into the gap between the first and second substrates 10 and 20, the polymerizable nematic liquid crystal material is selectively polymerized over the first and second electrode layers 12 and 22 (i.e., on the first and second alignment layers 14 and 24). Then, portions of the gap, in which a polymer material, obtained by polymerizing the polymerizable nematic liquid crystal material, is present in the vicinity of the first and second alignment layers 14 and 24, will be the first and second switching layers 16 and 26 exhibiting the smectic phase. On the other hand, the remaining portion of the gap between these two portions will be the liquid crystal layer 30 exhibiting the nematic phase.

To stabilize the smectic phase and express the spontaneous polarization, a chiral agent is preferably added to the mixture 40. Also, the mixture 40 is preferably prepared such that the resultant liquid crystal layer 30 will exhibit the nematic phase and will have negative dielectric anisotropy. If an excessive amount of polymerizable nematic liquid crystal material was added, then the threshold voltage to achieve the in-plane switching of molecules in the first and second switching layers 16 and 26 might rise too much. For that reason, to lower the threshold voltage, the amount of the polymerizable nematic liquid crystal material added is preferably small. Also, since a normal polymerizable nematic liquid crystal material often has positive dielectric anisotropy, the amount of the polymerizable nematic liquid crystal material added should be small from this point of view, too. Naturally, a polymerizable nematic liquid crystal material exhibiting negative dielectric anisotropy may also be used.

Methods of selectively polymerizing the polymerizable material over the first and second electrode layers 12 and 22 (i.e., on the first and second alignment layers 14 and 24), i.e., methods of selectively turning the material into a polymer or stabilizing it as a polymer (i.e., not turning it into a polymer entirely but partially by creating a polymer network, for example) inside of the first and second switching layers 16 and 26 or near the interfaces between the switching layers 16 and 26 and the liquid crystal layer 30 may include the following four methods, for example. By using at least one of the following methods in an arbitrary combination, the polymerizable material can be selectively polymerized in particular portions of the injected mixture 40.

1) Applying a Polymerization Initiator Onto the Surface of the Alignment Layers 14 and 24

The surface of the alignment layers 14 and 24 may be coated with a polymerization initiator by dissolving the polymerization initiator in a solvent, which is inactive against the polymerization initiator, thinly coating the surface of the alignment layers 14 and 24 with this solution, and then vaporizing the solvent. If the surface of the alignment layers 14 and 24 has been treated in this manner, then only portions of the mixture 40, injected into the gap between the substrates 10 and 20, will be polymerized near the respective surfaces of the alignment layers 14 and 24 when exposed to light (or when heated). This is because the polymerization initiator is present only in those regions.

2) Adding a Polymerization Initiator to the Alignment Layers 14 and 24

A polymerization initiator may be added to the alignment layers 14 and 24 by mixing the polymerization initiator with an alignment layer material being diluted with a solvent, thinly coating the substrates with this solution by a spin-coating technique, for example, and then vaporizing the solvent. In that case, only portions of the mixture 40 near the alignment layers 14 and 24 will be polymerized when exposed to light (or when heated). This is because the polymerization initiator is present only in those regions.

3) Selectively Irradiating Portions Near the Surfaces of the Substrates 10 and 20 with Light Portions of the mixture 40 near the respective surfaces of the substrates 10 and 20 may be selectively irradiated with light by defining an intensity distribution of the light perpendicularly to the surfaces of the substrates. If the mixture 40 including a photopolymerizable material is exposed to light with an intensity distribution, then the photopolymerizable material will be polymerized at a high rate and the liquid crystal material and the polymer material will cause a phase separation quickly in portions of the mixture 40 being irradiated with relatively intense light. Thus, in those portions, the polymer material will precipitate fast, thereby forcing out the liquid crystal material into other portions of the mixture being irradiated with relatively weak light. As a result, the nematic phase will be produced in those portions being irradiated with the relatively weak light, while the percentage of the remaining photopolymerizable material will decrease and the smectic phase will be produced in those portions being irradiated with the relatively intense light. Alternatively, the light may be absorbed into substantially only the portions near the surfaces of the substrates 10 and 20 by getting a material with high light (e.g., UV ray) absorptivity adsorbed into those portions near the surfaces of the substrates 10 and 20.

4) Concentrating the Polymerizable Material on the Surfaces of the Substrates by Taking Advantage of the Difference in Surface Free Energy Between the Liquid Crystal Material and the Polymerizable Material This method is applicable to a process including the steps of: injecting the mixture 40, including the liquid crystal material and the polymerizable material, into the gap between the substrates 10 and 20 at a temperature at which the mixture 40 exhibits an isotropic phase; gradually cooling the mixture 40 to separate it into the isotropic phase and a liquid crystalline phase; and then fixing this state by polymerizing the polymerizable material.

In such a process, by controlling the free energy of at least one of the isotropic and liquid crystalline phases in the process step of separating the mixture into these two phases, the overall energy of the system, engaged in the phase separation, can be minimized when the region exhibiting the isotropic phase and the region exhibiting the liquid crystalline phase have the desired arrangement and shapes. More specifically, the polymerizable material can be concentrated to the vicinity of the surfaces of the substrates by controlling the interfacial free energy of at least one of the two phases following a spatial and selective pattern.

For example, the surfaces of the substrates (i.e., the respective surfaces of the first and second alignment layers 14 and 24) may be selectively coated with a material that has mutually different interfacial free energies with respect to the liquid crystalline and isotropic phases. By appropriately defining the relationship between the interfacial free energies with respect to the liquid crystalline and isotropic phases in the portions coated with this material and the interfacial free energies with respect to the liquid crystalline and isotropic phases in the portions not coated with this material, the regions exhibiting the isotropic phase and the regions exhibiting the liquid crystalline phase can have their desired arrangement and shapes. Thereafter, by fixing the arrangement of the respective regions including the polymerizable material at mutually different ratios through the polymerization, the first and second switching layers 16 and 26 and the liquid crystal layer 30 can be defined. Specifically, supposing the surface free energies of the region coated with this material, the region that is not coated with this material, the liquid crystalline phase and the isotropic phase are represented by $\gamma 1$, $\gamma 2$, $\gamma L$ and $\gamma I$, respectively, the polymerizable material can be concentrated to the vicinity of the surfaces of the substrates when the inequality $(\gamma 1-\gamma 2)\times(\gamma L-\gamma I)>0$ is satisfied (i.e., either $\gamma 1>\gamma 2$ and $\gamma L>\gamma I$ or $\gamma 1<\gamma 2$ and $\gamma L<\gamma I$ are satisfied).

If the polymerization rate of the polymerizable material is sufficiently lower than the drift speed thereof and if there are at least two regions exhibiting mutually different degrees of affinity to the liquid crystal material on the surfaces of the substrates, then the phase separation will take place such that the liquid crystal material is concentrated toward the region with the higher degree of affinity and that the polymerizable material is forced out into the region with the lower degree of affinity.

That is to say, this method may be regarded as a method for separating the mixture into the liquid crystal material and the polymerizable material based on the difference in surface free energy. Accordingly, in this method, the level relationship between the surface free energies of the liquid crystal and polymerizable materials and the level relationship between the surface free energies of surface regions on the substrates are important. Specifically, if the surface free energy of the liquid crystal material is higher than that of the polymerizable material, then the polymerization reaction will proceed faster in the surface region with the lower surface free energy than in the surface region with the higher surface free energy.

If a polymerizable monomer including a fluorine (F) atom is added to the polymerizable material, then the polymerizable material will have decreased surface free energy and therefore, the phase separation effect will be achieved more significantly. Also, the compatibility between a polymerizable monomer including a fluorine atom and a liquid crystal material is normally low. For that reason, by adding the polymerizable monomer including a fluorine atom, the liquid crystal layer 30 and the first and second switching layers 16 and 26 can be separated from each other effectively.

Furthermore, by coating surface regions of the substrates, in which the polymerization reaction should advance faster, with a polymer material including a fluorine atom, the surface free energy thereof can be decreased significantly. Alternatively, the surface free energy of those regions may also be decreased by coating those regions with a polymer material to which a surfactant has been added.

Optionally, before the phase separation is induced by the polymerization reaction, a phase separation may be thermally caused in the mixture of the liquid crystal material and the polymerizable material by gradually cooling the mixture from a temperature higher than a homogeneous temperature to another temperature lower than the homogeneous temperature. Then, the mixture may have a liquid crystal material rich region including a lot of liquid crystal material and a polymerizable material rich region including a lot of polymerizable material in advance. Thereafter, if the polymerization reaction is initiated after such a region including the polymerizable material at a high concentration has been defined in this manner, the phases can be separated definitely. In this case, the higher the thermal energy needed to mix the liquid crystal material and the polymerizable material together (i.e., the harder it is to mix the liquid crystal and polymerizable materials together), the easier the liquid crystal and polymerizable materials can be separated from each other.

Various preferred embodiments of the present invention described above provide a liquid crystal optical element, which achieves a high aperture ratio, a wide viewing angle characteristic and high productivity with the unwanted coloring phenomenon of the outgoing light minimized, and also provide a method for fabricating such a liquid crystal optical element with a high aperture ratio, a wide viewing angle characteristic and high productivity without decreasing the display quality thereof.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal optical element comprising:
   a first substrate and a second substrate;
   a first liquid crystal layer, which is provided between the first and second substrates;
   a first electrode layer and a second electrode layer, which are provided on the first and second substrates, respectively, so as to face each other with the first liquid crystal layer interposed between them; and
   a first switching layer and a second switching layer, which are provided between the first electrode layer and the first liquid crystal layer and between the second electrode layer and the first liquid crystal layer, respectively, and each of which includes molecules that change their orientation directions in response to a voltage applied between the first and second electrode layers,
   wherein the first liquid crystal layer changes its orientation state as the molecules included in the first and second switching layers change their orientation directions, and
   wherein each of the molecules included in one of the first and second switching layers and an associated one of the molecules included in the other switching layer behave as a pair of enantiomers.

2. The liquid crystal optical element of claim 1, wherein the molecules included in each of the first and second switching layers change their orientation directions in a plane that is defined parallel to the surface of the first liquid crystal layer.

3. The liquid crystal optical element of claim 1, wherein when the voltage is applied between the first and second electrode layers, the molecule included in the one switching layer and the molecule included in the other switching layer change their orientation directions into mutually opposite directions.

4. The liquid crystal optical element of claim 1, further comprising a first alignment layer between the first switching layer and the first electrode layer and a second alignment layer between the second switching layer and the second electrode layer, respectively,
   wherein each of molecules included in one of the first and second alignment layers and an associated one of molecules included in the other alignment layer exist as a pair of enantiomers.

5. The liquid crystal optical element of claim 1, wherein each of the molecules included in one of the first and second switching layers and an associated one of the molecules included in the other switching layer exist as a pair of enantiomers.

6. The liquid crystal optical element of claim 1, wherein the first and second switching layers are provided as a second liquid crystal layer and a third liquid crystal layer, respectively, each of the second and third liquid crystal layers including a liquid crystal material.

7. The liquid crystal optical element of claim 6, wherein the liquid crystal material included in the first and second switching layers exhibits a smectic phase.

8. The liquid crystal optical element of claim 6, wherein the liquid crystal material included in the first and second switching layers exhibits at least one of ferroelectricity, antiferroelectricity and ferrielectricity.

9. The liquid crystal optical element of claim 6, wherein the liquid crystal material included in the first and second switching layers is a polymer liquid crystal material.

10. The liquid crystal optical element of claim 6, wherein each of the first and second switching layers includes a polymer material.

11. The liquid crystal optical element of claim 1, wherein the first liquid crystal layer includes a liquid crystal material exhibiting a nematic phase.

12. The liquid crystal optical element of claim 11, wherein the liquid crystal material included in the first liquid crystal layer exhibits negative dielectric anisotropy.

13. The liquid crystal optical element of claim 11, wherein the liquid crystal material included in the first liquid crystal layer exhibits substantially zero dielectric anisotropy.

14. A liquid crystal optical element comprising:
a first substrate and a second substrate;
a first liquid crystal layer, which is provided between the first and second substrates;
a first electrode layer and a second electrode layer, which are provided on the first and second substrates, respectively, so as to face each other with the first liquid crystal layer interposed between them; and
a first switching layer and a second switching layer, which are provided between the first electrode layer and the first liquid crystal layer and between the second electrode layer and the first liquid crystal layer, respectively, and each of which includes molecules that change their orientation directions in response to a voltage applied between the first and second electrode layers,
wherein the first liquid crystal layer changes its orientation state as the molecules included in the first and second switching layers change their orientation directions, and
wherein when the voltage is applied between the first and second electrode layers, each of the molecules included in one of the first and second switching layers and an associated one of the molecules included in the other switching layer change their orientation directions into mutually opposite directions but to substantially the same degree such that coloring of a light ray, which has been obliquely incident onto the first liquid crystal layer, is compensated for by a portion of the first liquid crystal layer, which is located closer to one of the first and second switching layers, and by another portion of the first liquid crystal layer, which is located closer to the other switching layer, in a reciprocating fashion.

15. The liquid crystal optical element of claim 14, wherein the molecules included in each of the first and second switching layers change their orientation directions in a plane that is defined parallel to the surface of the first liquid crystal layer.

16. The liquid crystal optical element of claim 14, wherein each of the molecules included in one of the first and second switching layers and an associated one of the molecules included in the other switching layer behave as a pair of enantiomers.

17. The liquid crystal optical element of claim 16, further comprising a first alignment layer between the first switching layer and the first electrode layer and a second alignment layer between the second switching layer and the second electrode layer, respectively,
wherein each of molecules included in one of the first and second alignment layers and an associated one of molecules included in the other alignment layer exist as a pair of enantiomers.

18. The liquid crystal optical element of claim 14, wherein each of the molecules included in one of the first and second switching layers and an associated one of the molecules included in the other switching layer exist as a pair of enantiomers.

19. The liquid crystal optical element of claim 14, wherein the first and second switching layers are provided as a second liquid crystal layer and a third liquid crystal layer, respectively, each of the second and third liquid crystal layers including a liquid crystal material.

* * * * *